(12) United States Patent
Roesler et al.

(10) Patent No.: US 7,718,730 B2
(45) Date of Patent: *May 18, 2010

(54) TWO-COMPONENT SILYLATED POLYURETHANE ADHESIVE, SEALANT, AND COATING COMPOSITIONS

(75) Inventors: Richard R. Roesler, Wexford, PA (US); Kurt C. Frisch, Upper St. Clair, PA (US); Craig E. Jansen, Wexford, PA (US); Dinesh Pethiyagoda, Pittsburgh, PA (US); Kevan E. Hudson, Clinton, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 374 days.

This patent is subject to a terminal disclaimer.

(21) Appl. No.: 10/742,484

(22) Filed: Dec. 19, 2003

(65) Prior Publication Data

US 2005/0137324 A1    Jun. 23, 2005

(51) Int. Cl.
| | |
|---|---|
| *B05D 3/02* | (2006.01) |
| *B32B 5/02* | (2006.01) |
| *B32B 7/12* | (2006.01) |
| *B32B 27/00* | (2006.01) |
| *B32B 27/04* | (2006.01) |
| *B32B 27/12* | (2006.01) |
| *B32B 27/40* | (2006.01) |
| *C08G 18/00* | (2006.01) |
| *C08G 18/08* | (2006.01) |
| *C08G 18/28* | (2006.01) |
| *C08G 77/04* | (2006.01) |
| *C08J 3/00* | (2006.01) |
| *C08K 3/20* | (2006.01) |
| *C08L 75/00* | (2006.01) |
| *C08L 83/00* | (2006.01) |
| *C08L 83/04* | (2006.01) |
| *C09J 4/00* | (2006.01) |
| *C09J 7/02* | (2006.01) |
| *C09J 101/00* | (2006.01) |
| *C09J 201/00* | (2006.01) |
| *D06M 15/643* | (2006.01) |

(52) U.S. Cl. ............ 524/588; 156/327; 156/329; 156/330.9; 156/331.1; 156/331.7; 427/372.2; 427/385.5; 428/423.1; 428/423.5; 428/424.2; 428/424.8; 428/425.8; 442/119; 442/152; 442/153; 442/164; 442/171; 524/590; 524/589; 524/591; 524/838; 524/840; 524/906; 528/28; 528/34; 528/44

(58) Field of Classification Search ............ 524/588, 524/590, 589, 591, 838, 839, 840, 906; 528/28, 528/34, 44; 156/327, 329, 330.9, 331.1, 156/331.4, 331.7; 427/372.2; 385.5; 428/423.1, 428/424.2, 423.5, 424.8, 425.8; 442/119, 442/152, 153, 164, 168, 170, 171
See application file for complete search history.

(56) References Cited

U.S. PATENT DOCUMENTS

| | | | |
|---|---|---|---|
| 3,278,457 A | 10/1966 | Milgrom | 260/2 |
| 3,278,458 A | 10/1966 | Belner | 260/2 |
| 3,278,459 A | 10/1966 | Herold | 260/2 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,829,505 A | 8/1974 | Herold | 260/611 B |
| 3,941,849 A | 3/1976 | Herold | 260/607 A |
| 4,355,188 A | 10/1982 | Herold | 568/620 |
| 4,364,955 A | 12/1982 | Krämer et al. | 424/269 |
| 4,386,992 A | 6/1983 | Takegawa et al. | 156/327 |
| 4,472,560 A | 9/1984 | Kuyper et al. | 526/120 |
| 4,479,840 A | 10/1984 | Takegawa et al. | 156/327 |
| 4,721,818 A | 1/1988 | Harper et al. | 568/120 |
| 4,843,054 A | 6/1989 | Harper | 502/175 |
| 5,554,709 A | 9/1996 | Emmerling et al. | 528/27 |
| 5,936,032 A | 8/1999 | Angus, Jr. | 524/863 |
| 6,057,415 A * | 5/2000 | Roesler et al. | 528/28 |
| 6,077,902 A | 6/2000 | Roesler et al. | 524/589 |
| 6,096,823 A | 8/2000 | Shaffer | 524/590 |
| 6,114,436 A | 9/2000 | Roesler | 524/588 |
| 6,265,517 B1 | 7/2001 | Stuart | 528/28 |
| 6,649,016 B2 | 11/2003 | Wu et al. | 156/329 |
| 2003/0055197 A1 | 3/2003 | Morikawa et al. | 528/44 |
| 2003/0229192 A1 | 12/2003 | Frisch et al. | 528/10 |
| 2004/0127622 A1 | 7/2004 | Pfenninger et al. | 524/425 |

* cited by examiner

*Primary Examiner*—Patrick D Niland
(74) *Attorney, Agent, or Firm*—Robert S. Klemz; John E. Mrozinski, Jr.; Noland J. Cheung

(57) ABSTRACT

A two-component adhesive, sealant, or coating composition containing (i) a first component containing a portion of an alkoxysilane-functional urethane and water; and (ii) a second component containing the remaining portion of the alkoxysilane-functional urethane and a catalyst. The alkoxysilane-functional urethane includes the reaction product of (a) the reaction product of a hydroxy functional compound and a polyisocyanate, that contains isocyanate groups; with (b) an amine functional aspartate. The composition is used in a method of bonding a first substrate to a second substrate. The method includes (a) combining component i) and component ii) to form a mixture, applying a coating of the mixture to at least one surface of the first substrate or the second substrate, and contacting a surface of the first substrate with a surface of the second substrate. The method is used make an assembly.

25 Claims, No Drawings

TWO-COMPONENT SILYLATED POLYURETHANE ADHESIVE, SEALANT, AND COATING COMPOSITIONS

BACKGROUND OF THE INVENTION

1. Field of the Invention

The present invention relates to two-component adhesive, sealant, and coating compositions and particularly to two-component compositions containing silylated polyurethanes.

2. Background Art

Adhesives are commonly used to join or fasten two or more adherends. Adherends are considered as being any two or more materials, or pieces of material that are being joined together, including wood, metals, plastics, paper, ceramics, stone, glass, concrete, etc. Adhesives used for these purposes are based on a wide range of technologies, including elastomer/solvent/resin mixtures, epoxies, latexes, polyurethanes, silicones, cyanoacrylates, acrylics, hot melts, and others. Such adhesives can have one or more drawbacks, such as they may contain solvents which are toxic and often flammable, they can be incompatible with one or more classes of adherends, they can have undesirably long cure times and in many cases the bonds they form are of insufficient strength.

It is often desirable for coatings applied to substrates to provide a desirable appearance, in many cases by applying multiple coating layers, the last of which can be a pigmented or unpigmented topcoat. Unfortunately, as the article containing the coated substrate ages, scratches that occur through normal "wear and tear", tend to deteriorate the appearance of the coated surface of the substrate, A sealant is typically a thin film, often containing a plastic, that is applied onto one or more surfaces on one or more substrates to prevent passage of a liquid or gas through the film. The sealant can be used to prevent exposure of the substrate or is often additionally used to prevent exposure via defects in a substrate or between gaps that can exist between substrates.

Silane functional resins are typically cured or crosslinked in a two-step sequence that requires first a reaction of water with an alkoxysilane group to form a silanol group followed by reaction of the silanol group with either another silanol group or an alkoxy silane. In one-component silane formulations, catalysts are typically included in order to increase the speed of the reactions. In many cases, the absorption of water is a limiting step in the curing or crosslinking process.

U.S. Pat. No. 5,936,032 to Angus, Jr. discloses a two part room temperature vulcanizable silicone adhesive sealant composition consisting of components A and B. Component A includes an alkoxy endcapped polydiorganosiloxane, a condensation curing catalyst, and a polyalkoxysilane crosslinking agent. Component B includes water and a disilanol endstopped polydiorganosiloxane.

U.S. Pat. Nos. 4,386,992 and 4,479,840 to Takegawa, et al. disclose a two-part adhesive that includes an aqueous synthetic resin emulsion adhesive and a gelling agent including a combination of a calcium salt, which can be calcium aspartate and an organic acid salt or an inorganic acid salt.

U.S. Pat. No. 6,649,016 to Wu et al. discloses an adhesive composition useful for bonding glass to a painted substrate that includes one or more polymers having a flexible backbone and silane moieties capable of silanol condensation; one or more titanates or zirconates; and an anhydrous strong organic acid.

U.S. Published Application 20030055197 A1 to Morikawa et al. discloses a laminate adhesive that includes a polyisocyanate curing agent containing an isocyanate group-terminated prepolymer and a silane coupling agent and an active hydrogen group-containing resin.

U.S. Pat. No. 6,114,436 to Roesler discloses moisture-curable compositions containing polyisocyanates having (cyclo)aliphatically-bound isocyanate groups and compounds containing alkoxysilane groups. The moisture-curable compositions can be used in coatings, adhesives or sealants.

U.S. Pat. No. 6,096,823 to Shaffer discloses moisture-curable compounds which have an isocyanate group content and an alkoxysilane group content and optionally contain repeating ethylene oxide units. The alkoxysilane groups are incorporated as the reaction products of a polyisocyanate component and amino compounds containing alkoxysilane groups. The moisture-curable compounds are useful in adhesive or sealing compositions as a binder.

U.S. Pat. No. 5,554,709 to Emmerling et al. discloses moisture-curing alkoxysilane-terminated polyurethanes obtained by reacting polyurethane prepolymers with sulfur-free alkoxysilanes. The moisture-curing alkoxysilane-terminated polyurethanes can be used in sealing and/or adhesive compositions.

However, known adhesives, sealants and coatings utilizing silane functional resins suffer from having a poor or short shelf life and/or stability and/or are slow to cure. Therefore, it would be desirable to identify adhesives containing silane functional resins that have a good or long shelf life and a reasonably fast rate of cure or crosslinking.

SUMMARY OF THE INVENTION

The present invention is directed to two-component adhesive, sealant, and/or coating composition containing (i) a first component containing a portion of a alkoxysilane-functional urethane and water; and (ii) a second component containing the remaining portion of the alkoxysilane-functional urethane and a catalyst. The alkoxysilane-functional urethane includes the reaction product of a) the reaction product of a hydroxy functional compound and a polyisocyanate, the reaction product containing isocyanate functional groups; with b) a compound corresponding to formula I:

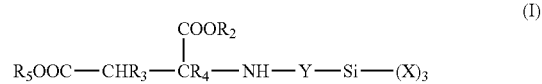

where
  X represents identical or different groups selected from $C_1$-$C_{10}$ linear or branched alkyl groups and $C_1$-$C_{10}$ linear or branched alkoxy groups with the proviso that at least two occurrences of X are alkoxy and if one or two X groups are methoxy, at least one X group must be a $C_1$-$C_{10}$ linear or branched alkyl group,
  Y represents a $C_1$-$C_8$ linear or branched alkylene group,
  $R_2$ and $R_5$ are identical or different and represent organic groups which are inert to isocyanate groups at a temperature of 100° C. or less, and
  $R_3$ and $R_4$ are identical or different and represent hydrogen or organic groups which are inert towards isocyanate groups at a temperature of 100° C. or less.

The present invention is also directed to a method of applying the above-described two-component composition including mixing component i) and component ii). Embodiments of the invention are directed to applying the mixture to one or more substrates.

The present invention is further directed to a method of bonding a first substrate to a second substrate. The method includes (a) combining component i) and component ii) to form a mixture, applying a coating of the mixture to at least one surface of the first substrate or the second substrate, and contacting a surface of the first substrate with a surface of the second substrate, where at least one of the contacting surfaces has the coating applied thereto.

The present invention is further directed to an assembly made according to the above-described method including at least the first substrate and the second substrate bonded together.

The present invention additionally provides a method of coating a substrate that includes applying the above-described two-component composition to at least a portion of a surface of the substrate as well as substrates prepared according to the method.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

As used herein the term "alkyl" refers to a monovalent radical of an aliphatic hydrocarbon chain of general formula $C_sH_{2s+1}$, where "s" is the number of carbon atoms, or ranges therefore, as specified. The term "substituted alkyl" refers to an alkyl group, where one or more hydrogens are replaced with a non-carbon atom or group, non-limiting examples of such atoms or groups include halides, amines, alcohols, oxygen (such as ketone or aldehyde groups), and thiols.

As used herein the terms "cyclic alkyl" or "cycloalkyl" refer to a monovalent radical of an aliphatic hydrocarbon chain that forms a ring of general formula $C_sH_{2s-1}$, where "s" is the number of carbon atoms, or ranges therefore, as specified. The term "substituted cycloalkyl" refers to a cycloalkyl group, containing one or more hetero atoms, non-limiting examples being —O—, —NR—, and —S— in the ring structure, and/or where one or more hydrogens are replaced with a non-carbon atom or group, non-limiting examples of such atoms or groups include halides, amines, alcohols, oxygen (such as ketone or aldehyde groups), and thiols. "R" represents an alkyl group of from 1 to 24 carbon atoms.

As used herein, the term "aryl" refers to a monovalent radical of an aromatic hydrocarbon. Aromatic hydrocarbons include those carbon based cyclic compounds containing conjugated double bonds where 4t+2 electrons are included in the resulting cyclic conjugated pi-orbital system, where t is an integer of at least 1. As used herein, aryl groups can include single aromatic ring structures, one or more fused aromatic ring structures, covalently connected aromatic ring structures, any or all of which can include heteroatoms. Non-limiting examples of such heteroatoms that can be included in aromatic ring structures include O, N, and S.

As used herein, the term "alkylene" refers to acyclic or cyclic divalent hydrocarbons having a carbon chain length of from $C_1$ (in the case of acyclic) or $C_4$ (in the case of cyclic) to $C_{25}$, typically $C_2$ to $C_{12}$, which may be substituted or unsubstituted, and which may include substituents. As a non-limiting example, the alkylene groups can be lower alkyl radicals having from 1 to 12 carbon atoms. As a non-limiting illustration, "propylene" is intended to include both n-propylene and isopropylene groups; and, likewise, "butylene" is intended to include n-butylene, isobutylene, and t-butylene groups.

As used herein, the term "(meth)acrylic" and "(meth)acrylate" are meant to include the corresponding derivatives of acrylic acid and methacrylic acid, without limitation.

As used herein, the term "cure" (or "curing") is intended to include both crosslinking of the adhesive, sealant, or coating composition components and film formation as a result of evaporation of water and, if present, other solvents and diluents along with the development of physical and chemical properties in the resultant film such as bond strength and peel strength.

As used herein, the term "crosslink" or "crosslinking" refers to the formation of short side chains of molecules linking two longer molecular chains together through the reaction of two or more functional groups on the short side chains.

Embodiments of the present invention provide a two-component adhesive, sealant, and/or coating composition that includes an alkoxysilane-functional urethane containing the reaction product of
a) the reaction product of a hydroxy functional compound and a polyisocyanate, the reaction product containing isocyanate functional groups; with
b) a compound corresponding to formula I (an amine functional aspartate):

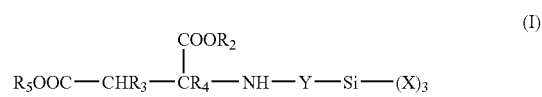

where
x represents identical or different groups selected from $C_1$-$C_{10}$ linear or branched alkyl groups and $C_1$-$C_{10}$ linear or branched alkoxy groups with the proviso that at least two occurrences of X are alkoxy and if one or two X groups are methoxy, at least one X group must be a $C_1$-$C_{10}$ linear or branched alkyl group,
Y represents a $C_1$-$C_8$ linear or branched alkylene group,
$R_2$ and $R_5$ are identical or different and represent organic groups which are inert to isocyanate groups at a temperature of 100° C. or less, and
$R_3$ and $R_4$ are identical or different and represent hydrogen or organic groups which are inert towards isocyanate groups at a temperature of 100° C. or less.

Formulating aqueous based adhesives, sealants and coatings utilizing silane functional resins has been problematic due to the extremely fast reaction with water observed with some silane functional resins, which has precluded their use in aqueous based adhesive, sealant and coating compositions. For example, trimethoxy silane functional resins (i.e., when all three X groups in formula I are methoxy) are so reactive with water that they cannot be formulated in aqueous based adhesive, sealant and coating compositions. As detailed herein, the reactivity of the silane groups can be controlled through the selection of higher alkoxy silane substituents and, optionally, alkyl substituents.

Referring to formula I, when one of the X groups is an alkyl group, even if the other two X groups are methoxy, the reaction rate of the silane group with water is slowed to an extent that formulation of the silane functional resin in aqueous based adhesive, sealant and coating compositions is possible. Further, when all three X groups are $C_2$-$C_{10}$ alkoxy groups, the reaction rate of the silane group with water is slowed to an extent that formulation of the silane functional resin in aqueous based adhesive, sealant and coating compositions is possible.

When formulated in a two-component system, where one component is free of water and contains a suitable catalyst, upon mixing, the silane functional resin has a reasonably fast rate of cure or crosslinking. Thus providing a highly useful adhesive, sealant and/or coating composition.

In an embodiment of the invention, any suitable hydroxy compound can be used in a). Non-limiting examples of suitable hydroxy functional compounds include monools, diols, polyols and mixtures thereof. Other non-limiting examples of suitable hydroxy functional compounds include polyester monools, diols, polyols and mixtures thereof, (meth)acrylic monools, diols, polyols and mixtures thereof, polyether monools, diols, and polyols and mixtures thereof, hydrocarbon monools, diols, polyols and mixtures thereof.

When polyether monools, diols, and polyols are used, the polyethers can have a number average molecular weight of at least 250, in some cases at least 500 and in other cases at least 1,000. Also, the number average molecular weight of the compound according to formula I can be up to 20,000, in some cases up to 15,000 and in other cases up to 12,000. The number average molecular weight of the compound according to formula I can vary and range between any of the values recited above.

The number average molecular weight can be determined by titration and/or by gel permeation chromatography using appropriate standards.

Any suitable polyether monool, diol, and/or polyol can be used in the present invention. Suitable methods for preparing polyethers are known and include the KOH process as is well known in the art as well as those described, for example, in EP-A 283 148 and U.S. Pat. Nos. 3,278,457, 3,427,256, 3,829,505, 4,472,560, 3,278,458, 3,427,334, 3,941,849, 4,721,818, 3,278,459, 3,427,335, and 4,355,188.

In one embodiment of the invention, the polyethers used in the invention can include unsaturated groups in the polyether molecule.

In another embodiment of the invention, the polyethers have a maximum total degree of unsaturation of 0.1 milliequivalents/g (meq/g) or less, in some cases less than 0.04 (meq/g) in other cases less than 0.02 meq/g, in some situations less than 0.01 meq/g, in other situations 0.007 meq/g or less, and in particular situations 0.005 meq/g or less. The amount of unsaturation will vary depending on the method used to prepare the polyether as well as the molecular weight of the polyether. Such polyethers are known and can be produced by, as a non-limiting example, the ethoxylation and/or propoxylation of suitable starter molecules. Non-limiting examples of suitable starter molecules include diols such as ethylene glycol, propylene glycol, 1,3-butanediol, 1,4-butanediol, 1,6 hexanediol and 2-ethylhexanediol-1,3. Also suitable are polyethylene glycols and polypropylene glycols.

Suitable polyester monools, diols, and polyols are known in the art and are typically produced by condensation of a glycol and/or polyol with a dicarboxylic acid or esterifiable or transesterifiable dicarboxylic acid derivative such as a lower alkanol ester or acid chloride. Examples of glycols and polyols useful include ethylene glycol, 1,2- and 1,3-propylene glycol, 1,4-butanediol, 1,6-hexanediol, cyclohexanedimethanol, 1,4-cyclohexanediol, glycerine, and the like. Suitable carboxylic acids or their derivatives include 1,4-butanedioic acid, glutaric acid, adipic acid, adipoyl chloride, azelaic acid, phthalic acid, isophthalic acid, terephthalic acid, dimethyl- terephthalate, and the like. Generally only minimal amounts of tri- or higher functionality monomers are employed so as to minimize viscosity.

The polyester monools, diols, and polyols can have a number average molecular weight in the range of 500 to 15,000, in some cases 1,000 to 8,000, and, in other cases 2,000 to 6,000, and somewhat higher in each range if triols or tetraols are used.

Suitable (meth)acrylic monools, diols, and polyols include homopolymers and copolymers of hydroxy functional (meth)acrylic monomers prepared by known polymerization methods. Suitable hydroxy functional (meth)acrylic monomers that can be used include, but are not limited to hydroxyethyl (meth)acrylate, hydroxypropyl (methacrylates) and hydroxy functional polyethers obtained by reacting hydroxyethyl (meth)acrylate or hydroxypropyl (methacrylates) with ethylene oxide and/or propylene oxide.

The (meth)acrylic monools, diols, and polyols can have a number average molecular weight in the range of 500 to 15,000, in some cases 1,000 to 8,000, and in other cases 2,000 to 6,000.

Suitable hydrocarbon monools, diols, and polyols include, but are not limited to $C_2$-$C_{20}$ linear, branched and cyclic alkyl, aryl, alkaryl, and aralkyl monools, diols, and polyols, ethylene glycol, 1,2- and 1,3-propylene glycol, 1,4-butanediol, 1,6-hexanediol, cyclohexanedimethanol, 1,4-cyclohexanediol, glycerine, and the like, polybutadiene diols and their hydrogenated counterparts, and mixtures thereof.

In an embodiment of the invention, any suitable polyisocyanate can be used in a). In certain embodiments of the invention, the polyisocyanate contains two or more, in some cases from 2 to 6 isocyanate groups. In a particular embodiment of the invention, the polyisocyanate has a structure according to formula (III):

$$OCN-R^7-NCO \qquad (III)$$

where $R^7$ is selected from $C_2$ to $C_{24}$ linear, branched, and cyclic alkylene, arylene, and aralkylene, which may optionally contain one or more isocyanate groups.

In a further particular embodiment, the polyisocyanate is selected from 1,4-diisocyanatobutane, 1,5-diisocyanatopentane, 1,6-diisocyanatohexane, 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis-(isocyanatomethyl)cyclohexane, 1,4-bis-(isocyanatomethyl)cyclohexane, isophorone diisocyanate, 4,4'-diisocyanatodicyclohexylmethane, triisocyanatononane, ω,ω'-diisocyanato-1,3-dimethylcyclohexane, 1-isocyanato-1-methyl-3-isocyanatomethylcyclohexane, 1-isocyanato-1-methyl-4-isocyanatomethylcyclohexane, bis-(isocyanatomethyl)-norbornane, 1,5-naphthalene diisocyanate, 1,3-bis-(2-isocyanatoprop-2-yl)benzene, 1,4-bis-(2-isocyanatoprop-2-yl)benzene, 2,4-diisocyanatotoluene, 2,6-diisocyanatotoluene, 2,4'-diisocyanatodiphenyl-methane, 4,4'-diisocyanatodiphenylmethane, 1,5-diisocyanatonaphthalene, 1,3-bis(isocyanatomethyl)benzene and mixtures thereof.

In another particular embodiment, the polyisocyanate can include one or more other isocyanate group-containing conventional polyisocyanates selected from biurets, uretdiones ("dimers"), allophanates and isocyanurates, iminooxadiazinediones ("trimers") of suitable isocyanate functional compounds can be used in the invention.

In an embodiment of the present invention, polyisocyanates having a functionality greater than two can be used. Examples of suitable polyisocyanates having a functionality greater than two include, but are not limited to, isocyanurates, biurets, uretdiones and allophanates. Isocyanurates can be formed by the trimerization of aliphatic or aromatic diisocyanates as is known in the art.

The biurets can be formed via the addition of a small amount of water to two moles of an isocyanate and reacting at slightly elevated temperature in the presence of a catalyst. The uretdione can be formed by the dimerization of an isocyanate. Allophanates can be prepared by the reaction of a diisocyanate with a urethane bond.

In a particular embodiment of the invention, the diisocyanates useful in the synthesis of isocyanurate, biurets, and uretdiones described above, which are then utilized in the invention include conventional aliphatic and aromatic diisocyanates, non-limiting examples of which include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), tetramethylxylyl diisocyanate (TMXDI), bis(4-isocyanatocyclohexyl)methane ($H_{12}$ MDI), bis(4-isocyanato-3-m thyl-cyclohexyl)methane, toluenediisocyanate (TDI), bis(4-isocyanatophenyl)methane (MDI) and mixtures thereof. Other non-limiting examples include the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the allophanate-modified trimer or higher oligomers of 1,6-diisocyanatohexane, the adduct of 3 moles of m-$\alpha,\alpha,\alpha',\alpha'$-tetramethylxylene diisocyanate to 1 mole of trimethylol propane, and mixtures thereof.

In an embodiment of the invention, the equivalent ratio of hydroxyl groups in the hydroxy functional compound to isocyanate groups in the polyisocyanate in a) is from 1:10 to 1:1, in some cases 1:5 to 1:1, in other cases 1:5 to 1:1.1 and in some situations 1:3 to 1:1.25. The ratio of equivalent groups in a) will be such that the reaction product in a) contains isocyanate functional groups.

In an embodiment of the invention, the reaction product in a) is reacted with b) an amine functional aspartate compound corresponding to formula I. In a particular embodiment, the reaction of a) with b) results in the reactive silane groups of the compound corresponding to formula I being incorporated into the alkoxysilane-functional urethane via the reaction an isocyanate group and the —NH— group of formula I.

In an embodiment of the present invention, the compound corresponding to formula I contains as groups $R_2$, $R_5$, $R_3$ and $R_4$, which can be identical or different, a methyl group, an ethyl group, or a $C_3$-$C_{20}$ linear, branched and cyclic alkyl, aryl, alkaryl, and aralkyl group.

In an embodiment of the invention, the amine functional aspartate according to formula I is the reaction product of an N-(trialkoxysilylalkyl) amine and a dialkyl maleate. In a particular embodiment, the N-(trialkoxysilylalkyl) amine has a structure according to formula (II):

$$NH_2—R^1—Si(—O—R^6)_3 \quad (II)$$

where $R^1$ is a $C_1$-$C_8$ linear or branched alkylene group; and $R_6$ is independently selected from $C_2$-$C_{10}$ linear or branched alkyl. In a specific embodiment, the N-(trialkoxysilylalkyl) is a N-(-3-trialkoxysilylalkyl) amine.

In an embodiment of the invention, the reaction product of a) is present at a level of at least 50%, in some cases at least 55%, in other cases at least 60%, in some situations at least 65% and in other situations at least 70% by weight of the alkoxysilane-functional urethane. Also, the reaction product of a) is present at a level of up to 99%, in some cases 97.5%, in other cases at least 90%, in some situations at least 85% and in other situations at least 80% by weight of the alkoxysilane-functional urethane. The reaction product of a) can be present in the alkoxysilane-functional urethane at any level stated above and can range between any level stated above.

In an embodiment of the invention, the amine functional aspartate b) is present at a level of at least 1%, in some cases at least 2.5%, in other cases at least 10%, in some situations at least 15% and in other situations at least 20% by weight of the alkoxysilane-functional urethane. Also, the amine functional aspartate is present at a level of up to 50%, in some cases 45%, in other cases at least 40%, in some situations at least 35% and in other situations at least 30% by weight of the alkoxysilane-functional urethane. The amine functional aspartate can be present in the alkoxysilane-functional urethane at any level stated above and can range between any level stated above.

In accordance with the present invention the isocyanate groups in a) react with the amine groups in b) to at least initially form urea groups. The urea groups initially formed may be converted to hydantoin groups in a known manner, e.g., by heating the compounds at elevated temperatures, optionally in the presence of a catalyst. Hydantoin groups will also form over time under ambient conditions. Therefore, the term "urea groups" is also intended to include other compounds containing the group, N—CO—N, such as hydantoin groups.

In an embodiment of the invention, the two-component adhesive, sealant, and/or coating composition includes:
(i) a first component containing a portion of the alkoxysilane-functional urethane and water; and
(ii) a second component containing the remaining portion of the alkoxysilane-functional urethane and a catalyst.

In an embodiment of the invention, the catalysts that can be used in ii) include, but are not limited to, titanate esters, e.g., those of tetrabutyl titanate and tetrapropyl titanate; organotin compounds, e.g., dibutyl tin dilaurate, dibutyl tin maleate, dibutyl tin diacetate, tin octylate and tin naphthenate; lead octylate; amine-based compounds and salts of these compounds and carboxylates, e.g., butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylene-diamine, guanidine, diphenylguanidine, 2,4,6-tris(dimethylamin-omethyl) phenol, morpholine, N-methyl morpholine, and 1,3-diazabicyclo(5,4,6) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., $\gamma$-aminopropyl trimethoxy silane and N-($\beta$-aminoethyl)aminopropyl methyldimethoxy silane). These compounds may be used either individually or in combination.

In a particular embodiment, the catalyst in ii) is one or more selected from paratoluene sulfonic acid, dibutyl tin dilaurate, dibutyltin acetoacetonate, triethylamine, and triethylene diamine.

In an embodiment of the invention, the alkoxysilane-functional urethane is present at a level of at least 25%, in some cases at least 30%, and in other cases at least 35% by weight of the first component. Also, the alkoxysilane-functional urethane is present at a level of up to 75%, in some cases up to 70%, and in other cases up to 65% of the first component. The alkoxysilane-functional urethane can be present in the first component at any level stated above and can range between any level stated above.

In an embodiment of the invention, the alkoxysilane-functional urethane is present at a level of at least 25%, in some cases at least 30%, and in other cases at least 35% by weight of the second component. Also, the alkoxysilane-functional urethane is present at a level of up to 75%, in some cases up to 70%, in other cases up to 65% by weight of the second component. The alkoxysilane-functional urethane can be present in the second component at any level stated above and can range between any level stated above.

In an embodiment of the invention, the alkoxysilane-functional urethane is present at a level of at least 25%, in some cases at least 30%, and in other cases at least 35% by weight of the two-component composition. When the amount of alkoxysilane-functional urethane is too low, insufficient cure can result. Also, the alkoxysilane-functional urethane is present at a level of up to 75%, in some cases up to 70%, in other cases up to 65% by weight of the two-component composition. When the amount of alkoxysilane-functional urethane is too high, the viscosity of the components can be too high and an insufficient amount of pigment will be present, limiting the tensile strength of the cured composition. The alkoxysilane-functional urethane can be present in the second component at any level stated above and can range between any level stated above.

In an embodiment of the invention, the component i) is present at from 10%, in some cases at least 15%, in other cases at least 20%, in some situations at least 25% and in other situations at least 30% by weight of the two-component composition. Also, the component i) is present at a level of up to 90%, in some cases up to 85%, in other cases up to 80%, in some situations up to 75% and in other situations up to 70% by weight of the two-component composition. The component i) can be present in the two-component composition at any level stated above and can range between any level stated above.

In an embodiment of the invention, the component ii) is present at from 10%, in some cases at least 15%, in other cases at least 20%, in some situations at least 25% and in other situations at least 30% by weight of the two-component composition. Also, the component ii) is present at a level of up to 90%, in some cases up to 85%, in other cases up to 80%, in some situations up to 75% and in other situations up to 70% by weight of the two-component composition. The component ii) can be present in the two-component composition at any level stated above and can range between any level stated above.

In an embodiment of the invention, either of first component i) or second component ii) can include one or more materials selected from leveling agents, wetting agents, flow control agents, antiskinning agents, antifoaming agents, fillers, adhesion promoters, viscosity regulators, plasticizers, pigments, dyes, UV absorbers, thermal stabilizers, antioxidants, and mixtures thereof.

Non-limiting examples of plasticizers that can be used in the present invention include dioctyl phthalate (DOP) dibutyl phthalate (DBP); diisodecyl phthalate (DIDP); dioctyl adipate isodecyl malonate; diethylene glycol dibenzoate, pentaerythritol ester; butyl oleate, methyl acetylricinoleate; tricresyl phosphate and trioctyl phosphate; polypropylene glycol adipate and polybutylene glycol adipate; and the like. Such plasticizers can be used alone or in combination of two or more. When plasticizers are used, they can be used to control or obtain a desired viscosity in the first component, the second component, and/or the initial mixture of the first and second components.

Non-limiting examples adhesion promoters that can be used in the present invention include epoxy resins, phenolic resins, silane and amino silane coupling agents known in the art, alkyl titanates and/or aromatic polyisocyanates.

Non-limiting examples of leveling agents that can be used in the present invention include cellulose, e.g., nitrocellulose and cellulose acetate butyrate.

Non-limiting examples of wetting agents that can be used in the present invention include glycols, silanes, anionic surfactants, and any other wetting agents known in the art.

Non-limiting examples of flow control agents, that can be used in the present invention include polyacrylic esters, non-ionic fluorinated alkyl ester surfactants, non-ionic alkylarylpolyether alcohols, silicones, and the like, as well as those available under the tradename RESIFLOW® by Estron Chemical, Inc., Parsippany, N.J., those sold under the tradename BENZOIN® by DSM, Inc.; those available under the tradename MODAFLOW® from Monsanto and those available under the tradename SURFYNOL® available from Air Products, Bethlehem, Pa.

Non-limiting examples of antiskinning agents that can be used in the present invention include lecithin, oximes, non-limiting examples being butyraldehayde oxime and methyl ethyl ketoxime, hydroqionones, non-limiting examples being 2,5-di-t-butyl-hydroquinone and the methyl esters of hydroquinone and anthraquinones.

Non-limiting examples of antifoaming agents that can be used in the present invention include those available as FOAMEX® from Rohm and Haas Company, Philadelphia, Pa., those available under the trade name BYK®, available from BYK-Chemie USA, Wallingford, Conn., and those available under the trade name FoamBrake® from BASF Corp., Mount Olive, N.J.

Non-limiting examples of fillers that can be used in the present invention include fumed silica, settling silica, silicic anhydride, silicic hydrate, talc, carbon black, limestone powder, coated and uncoated colloidal calcium carbonate, coated and uncoated ground calcium carbonate, coated and uncoated precipitated calcium carbonate, kaolin, diatomaceous earth, fired clay, clay, titanium dioxide, bentonite, organic bentonite, ferric oxide, zinc oxide, activated zinc white, and fibrous fillers such as glass fibers or filaments. The filler can have any suitable particle size, in an embodiment of the invention, the filler particle size can be from 5 nm to 10 μm, in some cases 10 nm to 5 μm, and in other cases from 25 nm to 1 μm. When fillers are used, they can be used to increase the tensile strength of the cured material.

Non-limiting examples of viscosity regulators that can be used in the present invention include alkali-soluble, acid-soluble, and hydrophobically-modified alkali-soluble or acid-soluble emulsion polymers, those available as ACRYSOL® from Rohm and Haas Company, cellulosics, modified cellulosics, natural gums, such as xanthan gum, and the like.

Non-limiting examples of pigments that can be used in the present invention include silica, calcium carbonate, magnesium carbonate, titanium oxide, iron oxide and carbon black. The pigments can have any suitable particle size, in an embodiment of the invention, the filler particle size can be from 5 nm to 10 μm, in some cases 10 nm to 5 μm, and in other cases from 25 nm to 1 μm. When pigments are used, they can be used to increase the tensile strength of the cured material.

Non-limiting examples of dyes that can be used in the present invention include mordant dyes, i.e., dyes prepared from plants, insects, and algae, and direct dyes, non-limiting examples being those based on benzidine or benzidine derivatives.

Non-limiting examples of ultra violet light (UV) absorbers that can be used in the present invention include benzotriazole-based ultra violet ray absorbers, salicylate-based ultraviolet ray absorbers, benzophenone-based ultraviolet ray absorbers, hindered amine-based light stabilizers and nickel-based light stabilizers.

Non-limiting examples of thermal stabilizers that can be used in the present invention include HCl scavengers, a non-limiting example being epoxidized soybean oil, esters of beta-thiodipropionic acid, non-limiting examples being lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis-(beta-dodecylmercapto)-propionate, and lead phosphate.

Non-limiting examples of antioxidants that can be used in the present invention include 2,6-di-t-butyl phenol, 2,4-di-t-butyl phenol, 2,6-di-t-butyl-4-methyl phenol, 2,5-di-t-butylhydroquinone, n-octadecyl-3-(3,5-di-t-butyl-4-hydroxyphenyl)propionate, pentaerythrityl-tetrakis[3-(3,5-di-t-butyl-4-hydroxyphenyl) propionate], 2,2'-methylenebis(4-methyl-6-t-butyl phenol), 4,4'-butylidenebis(3-methyl-6-t-butyl phenol), 4,4'-thiobis(3-methyl-6-t-butyl phenol), N,N'-diphenyl-p-phenylenediamine, 6-ethoxy-2,2,4-trimethyl-1,2-dihydroquinoline and the antioxidants available under the trade name IRGANOX® from Ciba Specialty Chemicals, Basel, Switzerland.

In an embodiment of the invention, the present two-component adhesive, sealant, and/or coating composition, including component i) and component ii) are stable at 50° C. As used herein, the term "stable" means that the composition does not gel or build viscosity to the point that it is no longer free flowing.

Embodiments of the present invention are also directed to a method of applying the above-described two-component adhesive, sealant, and/or coating composition including mixing component i) and component ii). In these embodiments, the method can include applying the mixture to one or more substrates.

An embodiment of the invention is directed to a method of bonding a first substrate to a second substrate. The method includes (a) combining component i) and component ii) to form a mixture, applying a coating of the mixture to at least one surface of the first substrate or the second substrate, and contacting a surface of the first substrate with a surface of the second substrate, where at least one of the contacting surfaces has the coating applied thereto.

While not being bound to a single theory, the bond between substrates is formed using the inventive composition based on the interfacial interactions (for example wetting and surface energies) between the composition and the substrates and the development of crosslinks in or the curing of the composition. Further, the alkoxysilane functional groups are selected such that the reaction rate with water is slow enough to allow for mixing and application, but fast enough that cure is completed in a reasonable amount of time. The alkoxysilane functional group limitations are set forth in the description of the groups designated X in formula I, which represents identical or different groups selected from $C_1$-$C_{10}$ linear or branched alkyl groups and $C_1$-$C_{10}$ linear or branched alkoxy groups with the proviso that at least two occurrences of X are alkoxy and if one or two X groups are methoxy, at least one X group must be a $C_1$-$C_{10}$ linear or branched alkyl group. The selection of "X" effectively controls the cure rate.

In the present invention, one or both of the first substrate and the second substrate, or any additional substrates, can include wood, metals, plastics, paper, canvas, ceramics, stone, glass, concrete and combinations thereof. The present method can be used to bond substrates containing the same or different materials.

In a particular embodiment, the metal comprises iron or aluminum. Also, the plastic can be selected from poly(ethylene), poly(propylene), poly(ethylene terephthalate), and mixtures thereof. Further, the canvas can include one or more fibers selected from cotton fibers, nylon fibers, poly(ethylene) fibers, poly(propylene) fibers, poly(ethylene terephthalate) fibers, and mixtures thereof.

In an embodiment of the invention, the substrates are contacted at a temperature sufficient to promote the composition's ability to bond the substrates together. As such, the substrates are contacted at a temperature of at least 0° C., in some cases at least 10° C., in other cases at least 20° C. and in some situations at least 25° C. Also, the contact temperature for the substrates can be up to 150° C., in some cases up to 120° C., in other cases up to 100° C. and in some situations up to 80° C. The temperature for contacting the substrates can be any value or range between any value recited above.

In an embodiment of the invention, the substrates are contacted at a pressure sufficient to promote the composition's ability to bond the substrates together. As such, the substrates are contacted at a pressure of at least ambient or atmospheric pressure, in some cases at least 10 psi, in other cases at least 20 psi and in some situations at least 30 psi. Also, the contact pressure for the substrates can be up to 500 psi, in some cases up to 400 psi, in other cases up to 300 psi and in some situations up to 250 psi. The pressure for contacting the substrates can be any value or range between any value recited above.

In an embodiment of the invention, and depending on the composition of the present two-component composition, the contact temperature and pressure, the substrates are contacted for a length of time sufficient to promote the composition's ability to bond the substrates together. As such, the length of time the substrates are contacted is at least 30 seconds, in some cases at least 1 minute, in other cases at least 5 minutes and in some situations at least 15 minutes. Also, the contact time for the substrates can be up to 24 hours, in some cases up to 12 hours, in other cases up to 8 hours and in some situations up to 6 hours. The length of time for contacting the substrates can be any value or range between any value recited above.

The present invention is further directed to an assembly made according to the above-described method including at least the first substrate and the second substrate bonded together.

Embodiments of the present invention provide a method of coating a substrate that includes applying the above-described two-component compositions to at least a portion of a surface of a substrate. The two-component compositions can be applied to any desired substrates, such as wood, plastics, leather, paper, textiles, glass, ceramics, plaster, masonry, metals and concrete. They can be applied by standard methods, such as spray coating, spread coating, flood coating, casting, dip coating, and roll coating. The coating compositions may be clear or pigmented.

In an embodiment of the invention, the two-component composition is used to coat metal substrates.

Coatings including the two-component compositions can be cured at ambient temperature or at elevated temperatures. In an embodiment of the invention, the two-component compositions are cured at ambient temperatures. In other embodiments, heat is applied during curing such that the temperature is from 60° to 120° C., in some cases 800 to 100° C.

Depending on the specific two-component composition and the cure temperature, the two-component coating composition is cured for a period of from 20 minutes to 30 days, in some cases from 20 minutes to 10 days, in other cases from 20 minutes to 24 hours, in some situations from 20 minutes to 12 hours, in other situations from 20 minutes to 6 hours and in certain situations from 20 minutes to 4 hours.

The present invention is more particularly described in the following examples, which are intended to be illustrative only, since numerous modifications and variations therein will be apparent to those skilled in the art. Unless otherwise specified, all parts and percentages are by weight.

EXAMPLES

Example 1

The example demonstrates the preparation of a silane functional aspartate according to the invention. The aspartate resin was prepared according to U.S. Pat. No. 4,364,955 to Kramer et al. To a 5-liter flask, fitted with agitator, thermocouple, nitrogen inlet, addition funnel and condenser was added 439.4 g (1.99 equivalents (eq.)) of 3-aminopropyltriethoxysilane followed by 341.6 g (1.99 eq.) diethyl maleate over a two hour period at 25° C., and held at that temperature for five hours. The unsaturation number, determined by iodine titration, was 0.6, indicating that the reaction was approximately 99% complete. The amine number was 140.6 mg KOH/g resin. The viscosity was 11 cps measured using a Brookfield® Digital Viscometer, Model DV-II+, Brookfield Engineering, Inc., Middleboro, Mass., spindle 52, 100 rpm at 25° C.

Example 2

A comparative aspartate resin was prepared according to the method in Example 1 except that 356 g (1.99 eq.) of 3-aminopropyl-trimethoxysilane was used.

Example 3

Preparation of a silane terminated polyurethane (STP) referred to as STP-1, according to the invention. To a 2-liter, round bottom flask equipped with an agitator, nitrogen inlet, heater, addition funnel, and condenser was added 988 g (0.18 eq.) of ACCLAIM® 12200 (polyoxypropylene diol available from Bayer Polymers LLC, Pittsburgh, Pa.). The flask was heated to 105° C. and a vacuum was applied to 30 tor for 30 minutes to remove dissolved water. The vacuum was removed and the flask cooled to 30° C. and 32 g (0.36 e.g.) toluylene diisocyanate (TDI) was added. The mixture was heated to 60° C. and held for 36 hours after which the NCO content was 0.75 wt. % by NCO titration was reached (theoretical=0.74%). The silane functional aspartate of Example 1, 72.15 g (0.181 eq.) was then added and the mixture was heated to 60° C. where the mixture was held for one hour. No NCO content was observed by IR. Next, 5.5 g of vinyl trimethoxysilane was added as a moisture scavenger. The viscosity was 31,500 cps at 25° C. and density was 8.4 lbs./gal.

Example 4

Preparation of a silane terminated polyurethane (STP) referred to as STP-2, a comparative example. To a 5-liter, round bottom flask equipped with an agitator, nitrogen inlet, heater, addition funnel, and condenser was added 2,700 (0.49 eq.) of ACCLAIM® 12200. The flask was heated to 105° C. and a vacuum was applied to 30 tor for 30 minutes to remove dissolved water. The vacuum was removed and the flask cooled to 30° C. and 110.3 g (0.36 e.g.) isophorone diisocyanate (IPDI) was added. The mixture was heated to 60° C. and held for 36 hours after which the NCO content was 0.64 wt. % by NCO titration was reached (theoretical=0.74%). The silane functional aspartate of Example 2,181.6 g (0.49 eq.) was then added and the mixture was heated to 60° C. where the mixture was held for 15 hour. No NCO content was observed by IR. Next, 5.5 g of vinyl trimethoxysilane was added as a moisture scavenger. The viscosity was 72,200 cps at 25° C. and density was 8.4 lbs./gal.

Example 5

Stability testing of STP samples. 50 g of each sample and 0.5 g were mixed and stored at 23° C. and 50° C. The viscosities were measured using a Brookfield® Digital Viscometer, Model DV-I+, LV spindle #4 at 12 rpm and 23° C. and 50° C. respectively. The results are shown in the table below, all entries are viscosity in cps.

| Conditions | STP-1 @ 23° C. | STP-1 @ 50° C. | STP-2 @ 23° C. | STP-2 @ 50° C. |
|---|---|---|---|---|
| Age of sample | | | | |
| Initial | 31,500 | — | 72,200 | — |
| 2 days | 31,600 | 7,650 | 130,800 | Gelled |
| 7 days | 34,350 | 9,850 | gelled | Gelled |

The data demonstrate the superior stability and shelf-life of the compositions of the present invention.

Example 6

This example demonstrates the cure rate of STP-1. A one-component system was prepared by mixing 1009 STP-1,1 g of a diaminosilane available as SILQUES® A-1120 available from OSi Specialties, Inc., Danbury Conn., 2 g of an organo-functional silane available as SILQUES® A-171 available from OSi Specialties, and 1 g di-(n-butyl) tin bis-ketonate available as METATIN® 740 from Rohm and Haas Inc., Philadelphia, Pa. Curing speed was determined by applying a 45 mil wet film in a Gardner Dry Time Meter (BYK-Gardner USA, Columbia, Md.) as described in the Pacific Scientific Instruction Manuals DG-9600 and DG-9300. The Dry Time Meter has a needle that is pulled across the wet film. When the needle rises above the semi cured film, it is determined that surface dry has been achieved. The needle will still leave trail at that level of cure. When no scoring of the surface occurs, it is judged that through-cure has been achieved. At room temperature the formulation had a surface dry of 4.25 hours and a through cure at 11.75 hours.

Example 7

This example demonstrates the formulation of a two-component adhesive. Component A was formulated with tin catalyst and Component B was formulated with water.

| Formulation | Clear | Pigmented |
|---|---|---|
| Component A | | |
| STP 1 | 50.0 | 50.0 |
| Carbon black[1] | | 25.0 |
| Diisodecyl phthalate | 10.0 | 25.0 |
| Silquest A-1120 | 0.5 | 0.5 |
| Silquest A-171 | 0.25 | 0.25 |
| di-(n-butyl)tin bis-ketonate[2] | 0.5 | 0.5 |
| Component B | | |
| STP 1 | 50.0 | 50.0 |
| Carbon black[1] | | 25.0 |
| Diisodecyl phthalate | 10.0 | 25.0 |
| Deionized water | 1.0 | 0.5 |

[1]MONARCH ® 120 available from Cabot Corporation, Billerica, MA, registered trademark of Cabot.
[2]METATIN ® 740 available from Rohm and Haas Inc., Philadelphia, PA, registered trademark of Rohm and Haas.

Components A and B were mixed separately on a Hauschild SPEED MIXER™ available from FlackTek Inc., Landrum, S.C., for 1 minute. At the time of application, components A and B were mixed together for evaluation. The mixture was drawn down at 50 mils wet on a TEFLON® (trademark registered to E. I. du Pont de Nemours and Company, Wilmington, Del.) board to prepare films, which were allowed to cure for 1 week at 72° F. (22° C.), 50% RH. The tensile, elongation at break and modulus were determined on 0.5 inch butterfly die-cut samples at a crosshead speed of 20.0 inch/minute (7.9 cm/min.) on an electromechanical universal tester available from Instron Corp., Canton, Mass. Dry times were determined as previously described.

| Dry times | | |
|---|---|---|
| Surface dry (hours) | 2.4 | 2.1 |
| Hard dry (hours) | 8.5 | 8.5 |
| Tensile properties | | |
| Elongation, % | 133 | 157 |
| Tensile strength (psi) | 86 | 315 |
| 100% Modulus | 71 | 179 |
| Tear strength (pli) | 7 | 20 |

The above example demonstrates that the two component formulation cures faster than the one component formulation; and that the pigmentation increases the tensile properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component kit for preparing an adhesive, sealant, or coating composition comprising:
    a first component comprising,
        water, combined with
        a first portion of an alkoxysilane-functional urethane comprising the reaction product of
            a) the reaction product of a hydroxy functional compound and a polyisocyanate, the reaction product containing isocyanate functional groups; with
            b) a compound corresponding to formula I:

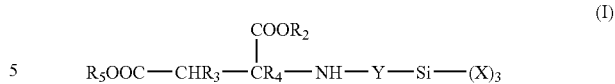

wherein

X represents identical or different groups selected from $C_1$-$C_{10}$ linear or branched alkyl groups and $C_1$-$C_{10}$ linear or branched alkoxy groups with the proviso that at least two occurrences of X are alkoxy and if one or two X groups are methoxy, at least one X group must be a $C_1$-$C_{10}$ linear or branched alkyl group, Y represents a $C_1$-$C_8$ linear or branched alkylene group, $R_2$ and $R_5$ are identical or different and represent organic groups which are inert to isocyanate groups at a temperature of 100° C. or less, and $R_3$ and $R_4$ are identical or different and represent hydrogen or organic groups which are inert towards isocyanate groups at a temperature of 100° C. or less, ; and a second component comprising
    a second portion of the alkoxysilane-functional urethane, combined with
    a catalyst;
with the proviso that the second component does not contain water.

2. The two-component kit for preparing an adhesive, sealant, or coating composition of claim 1, wherein the hydroxy functional compound in a) is a polyol.

3. The two-component kit for preparing an adhesive, sealant, or coating composition of claim 1, wherein the hydroxy functional compound in a) is a diol.

4. The two-component kit for preparing an adhesive, sealant, or coating composition of claim 1, wherein the hydroxy functional compound is selected from the group consisting of polyester monools, diols, polyols and mixtures thereof, (meth)acrylic monools, diols, polyols and mixtures thereof, polyether monools, diols, polyols and mixtures thereof, hydrocarbon monools, diols, polyols and mixtures thereof, and mixtures thereof.

5. The two-component kit for preparing an adhesive, sealant, or coating composition of claim 1, wherein the compound of formula I is the reaction product of an N-(trialkoxysilylalkyl) amine and a dialkyl maleate.

6. The two-component kit for preparing an adhesive, sealant, or coating composition of claim 5, wherein the N-(trialkoxysilylalkyl) amine has a structure according to formula (II):

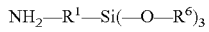

wherein $R^1$ is a $C_1$-$C_8$ linear or branched alkylene group; and $R^6$ is independently selected from $C_2$-$C_{10}$ linear or branched alkyls.

7. The two-component kit for preparing an adhesive, sealant, or coating composition of claim 1, wherein the polyisocyanate contains from 2 to 6 isocyanate groups.

8. The two-component kit for preparing an adhesive, sealant, or coating composition of claim 1, wherein the polyisocyanate has a structure according to formula (III):

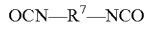

wherein R$^7$ is selected from C$_2$ to C$_{24}$ linear, branched, and cyclic alkylene, arylene, and aralkylene, which may optionally contain one or more isocyanate groups.

9. The two-component kit for preparing an adhesive, sealant, or coating composition of claim 1, wherein the polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl -3,5,5-trimethyl-cyclohexane, bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3-diisocyanate, α,α,α',α'-1,4-xylylene diisocyanate, 1-isocyanato-1-methyl-4(3)-isocyanatomethyl cyclohexane, 2,4-hexahydrotoluylene diisocyanate, 2,6-hexahydrotoluylene diisocyanate, 1,3-phenylene diisocyanate, 1,4-phenylene diisocyanate, 2,4-toluytene diisocyanate, 2,6-toluylene diisocyanate, 2,4-diphenyl-methane diisocyanate, 4,4'-diphenyl-methane diisocyanate, 1,5-diisocyanato naphthalene and mixtures thereof.

10. The two-component kit for preparing an adhesive, sealant, or coating composition of claim 1, further comprising, in either or both of I) and ii), one or more materials selected from the group consisting of leveling agents, wetting agents, flow control agents, antiskinning agents, antifoaming agents, fillers, adhesion promoters, viscosity regulators, plasticizers, pigments, dyes, UV absorbers, thermal stabilizers, antioxidants, and mixtures thereof.

11. The two-component kit for preparing an adhesive, sealant, or coating composition of claim 1, wherein the reactive silane groups of the compound corresponding to formula I are incorporated as the reaction product of an isocyanate group and the —NH— group of formula I.

12. The two-component kit for preparing an adhesive, sealant, or coating composition of claim 1, wherein the catalyst in ii) is one or more selected from the group consisting of paratoluene sulfonic acid, dibutyl tin dilaurate, dibutyltin acetoacetonate, triethylamine, and triethylene diamine.

13. The two-component kit for preparing an adhesive, sealant, or coating composition of claim 1, wherein component i) and component ii) are both stable at 50° C.

14. The two-component kit for preparing an adhesive, sealant, or coating composition of claim 1, wherein the equivalent ratio of hydroxyl groups in the hydroxy functional compound to isocyanate groups in the polyisocyanate in a) is from 1:10 to 1:1.

15. The two-component kit for preparing an adhesive, sealant, or coating composition of claim 1, wherein the reaction product a) is present at from 50 to 99 percent by weight and the amine functional aspartate b) is present at from 1 to 50 percent by weight of the alkoxysilane-functional urethane.

16. The two-component kit for preparing an adhesive, sealant, or coating composition of claim 1, wherein the component i) is present at from 10 to 90 percent by weight and component ii) is present at from 10 to 90 percent by weight of the composition.

17. The two-component kit for preparing an adhesive, sealant, or coating composition of claim 4, wherein the polyether has a number average molecular weight of from 500 to 15,000.

18. A method of applying a two-component kit for preparing an adhesive, sealant, or coating composition to a substrate comprising mixing component i) and component ii) of claim 1.

19. A method of bonding a first substrate to a second substrate comprising
combining the first component and the second component of claim 1 to form a mixture,
applying a coating of the mixture to at least one surface of the first substrate or the second substrate, and
contacting a surface of the first substrate with a surface of the second substrate, wherein at least on of the contacting surfaces has the coating applied thereto.

20. The method of claim 19, wherein one or both of the first substrate and the second substrate comprises a substrate selected from the group consisting of wood, metals, plastics, paper, canvas, ceramics, stone, glass, and concrete.

21. The method of claim 20, wherein the metal comprises iron or aluminum.

22. The method of claim 20, wherein the plastic is selected from the group consisting of poly(ethylene), poly(propylene), poly(ethylene terephthalate), and mixtures thereof.

23. The method of claim 20, wherein the canvas comprises one or more fibers selected from the group consisting of cotton fibers, nylon fibers, poly(ethylene) fibers, poly(propylene) fibers, poly(ethylene terephthalate) fibers, and mixtures thereof.

24. The method of claim 19, wherein the first substrate and the second substrate are contacted at a temperature of from 0° C. to 150° C.

25. The method of claim 19, wherein the first substrate and the second substrate are contacted at a pressure of from atmospheric pressure to 500 psi.

* * * * *